(12) United States Patent
Laftchiev et al.

(10) Patent No.: US 11,280,514 B1
(45) Date of Patent: Mar. 22, 2022

(54) SYSTEM AND METHOD FOR THERMAL CONTROL BASED ON INVERTIBLE CAUSATION RELATIONSHIP

(71) Applicant: Mitsubishi Electric Research Laboratories, Inc., Cambridge, MA (US)

(72) Inventors: Emil Laftchiev, Cambridge, MA (US); Daniel Nikovski, Brookline, MA (US); Diego Romeres, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/098,387

(22) Filed: Nov. 15, 2020

(51) Int. Cl.
  F24F 11/00 (2018.01)
  F24F 11/64 (2018.01)
  F24F 11/80 (2018.01)
  F24F 120/12 (2018.01)
  F24F 110/20 (2018.01)
  F24F 110/10 (2018.01)

(52) U.S. Cl.
  CPC .............. F24F 11/64 (2018.01); F24F 11/80 (2018.01); *F24F 2110/10* (2018.01); *F24F 2110/20* (2018.01); *F24F 2120/12* (2018.01)

(58) Field of Classification Search
  CPC .................................. F24F 11/64; F24F 11/80
  See application file for complete search history.

(56) References Cited

U.S. PATENT DOCUMENTS

| | | | |
|---|---|---|---|
| 2003/0160103 A1* | 8/2003 | Guo ................... | G05D 23/1917 236/47 |
| 2016/0246269 A1* | 8/2016 | Ahmed ..................... | F24F 11/46 |
| 2019/0353377 A1* | 11/2019 | Mao .......................... | F24F 11/58 |
| 2020/0355391 A1* | 11/2020 | Wenzel ..................... | F24F 11/65 |
| 2021/0011443 A1* | 1/2021 | McNamara .......... | G05B 19/042 |

* cited by examiner

*Primary Examiner* — Mark A Connolly
(74) *Attorney, Agent, or Firm* — Gennadiy Vinokur; Hironori Tsukamoto

(57) ABSTRACT

A controller for controlling a heating, ventilating, and air-conditioning (HVAC) system arranged to condition an environment according to HVAC setpoints is provided. The controller is configured to accept target values of thermal states at predetermined locations in the conditioned environment, current values of the thermal states at the predetermined locations in the conditioned environment, and current values of the HVAC setpoints. The controller is further configured to determine, using a neural network, target HVAC setpoints such that a difference in an operation of the HVAC system according to the target HVAC points with respect to the operation of the HVAC system according to the current HVAC setpoints changes thermal states in the predetermined locations in the conditioned environment from the current values of the thermal state to the target values of the thermal state.

18 Claims, 13 Drawing Sheets

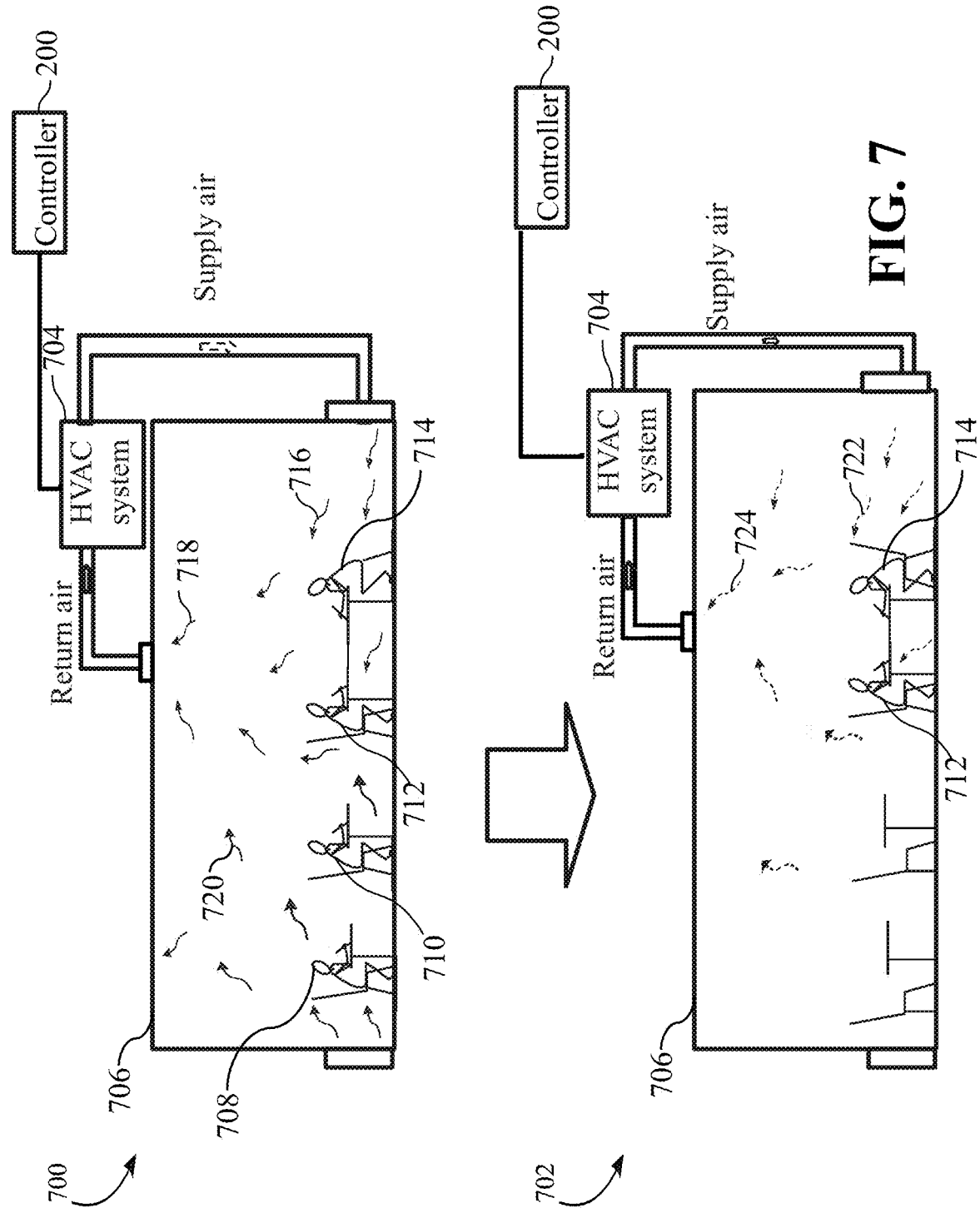

SYSTEM AND METHOD FOR THERMAL CONTROL BASED ON INVERTIBLE CAUSATION RELATIONSHIP

TECHNICAL FIELD

The present disclosure relates generally to control of thermal comfort in an environment and more particularly to controlling a heating, ventilating, and air-conditioning (HVAC) system arranged to condition an environment according to HVAC set points.

BACKGROUND

Thermal comfort may be considered as a condition of mind that expresses satisfaction with a thermal environment and is assessed by subjective but generally stable evaluation. The thermal comfort significantly impacts a person's productivity and general well-being. Currently, thermal conditioning systems, such as heating, ventilating, and air-conditioning (HVAC) systems achieve the thermal comfort based on a wall thermostat or a remote-control device, whose purpose is to turn the HVAC system on or off and operate the HVAC system such that temperature setpoints are maintained.

The temperature set points indicate a desired level of the thermal comfort based on needs and thermal condition of occupants in a room. Some approaches are designed to control the HVAC systems to achieve the temperature setpoints. However, in such approaches, the HVAC systems control only a setpoint air temperature as a surrogate for the thermal comfort of the occupant or set of occupants in the room. Hence, such approaches designed assume that the temperature of the room at the thermostat and at the occupant's own location is same. This assumption may be referred to as uniformity assumption of well-mixed temperature and/or velocity distribution in the room. However, such uniformity assumption is not valid. As a result, even when the temperature setpoint is reached, some or all occupants of the room may still be uncomfortable, as the setpoint temperature is determined for a sensor (thermostat) which may be located at a distance from the occupant.

To address the uniformity assumption problem, some approaches consider dynamics of airflow in a controlled environment (room). However, such approaches are computationally expensive. For example, a physical model of airflow dynamics can be defined according to a Navier-Stokes equation. While the physical model of airflow dynamics can be approximated by a Boussinesq equation, the Boussinesq equation is a partial differential equation (PDE), which is difficult to solve in real time. To that end, some methods aim to reduce the complexity of computation needed to solve the PDE by using a reduced order model including an ordinary differential equation (ODE). However, considering the airflow dynamics even using the reduced order model can still be computationally challenging for a number of control systems, in particular, for embedded control systems that use embedded processors.

Accordingly, there is a need to provide a system and a method to control HVAC system that consider the dynamics of the thermal state in the controlled environment without a need to use a model of thermal state.

SUMMARY

It is an object of some embodiments to provide a system and a method that utilizes artificial intelligence, such as neural networks, to consider dynamics of the airflow and/or thermal state in an environment to control an HVAC system without a need to use a model of thermal state. It is also an object of some embodiments to provide such a neural network that overcomes infinite dimensionality problem of HVAC control which arises from the desire to control the temperature of all spatial locations in a room conditioned using an HVAC unit. Additionally, it is an object of some embodiments to learn predictive models relating HVAC setpoints and sensors' measurements throughout the environment, using a neural network having an autoencoding architecture with an autoencoding loss function. Additionally, or alternatively, it is an object of some embodiments to learn a control law that maximizes an occupant's comfort in the environment.

Some embodiments are based on recognition that a control of the HVAC system which considers dynamics of the thermal state in the environment operates on a continuous spatial domain. For example, thermal states, such as temperature, humidity, and/or velocity values, in the environment may vary continuously along all spatial dimensions. Hence, there exists infinite number of values of the control commands (which can also be given on a continuous scale) and/or the thermal states in the environment. However, the neural network requires fixed numbers of inputs and outputs. Thus, trying to approximate the thermal state dynamics at all spatial locations in the controlled environment is challenging using a statistical model such as a neural network.

Some embodiments are based on realization that there is no need to map all the thermal states values in all spatial locations in the environment to continuous values of states of the HVAC actuators. Some embodiments are based on a recognition that, to operate the HVAC system, it is sufficient to map the values of the temperature, the humidity, and/or the velocity in the environment in only certain locations to setpoints that when reached achieve desired values of the thermal states at those discrete locations. To that end, a mapping between the thermal states at specific locations in the environment and the set points of the HVAC system can be derived. As used herein, "setpoint" refers to a desired value of a variable of the HVAC system. For example, the term "setpoint" may indicate a target value of temperature that the operation of the HVAC system needs to achieve at a specific location in the environment.

To address this problem, discretized spatial representation of steady-state of the thermal state is used. Some embodiments are based on realization that the mapping between the thermal states in the environment and the setpoints to HVAC system can be considered for steady-state modeling of the thermodynamics of the environment. In contrast with full modeling which considers both transient and the steady-state of thermodynamics, the steady-state modeling can be more easily accurately sampled. In addition, at steady-state, the spatially continuous thermal states in the environment can be more accurately represented at fixed and/or predetermined locations in the environment. In such a manner, the discretized representation of the steady-state of the thermal state allows to address the infinite dimensionality problem of HVAC control of the thermal state in an environment. In other words, the discretized representation of the steady-state of thermal state allows transforming infinite mapping between the continuous thermal states and the continuous values of HVAC actuators' states to a finite mapping between discretized steady thermal states at a set of locations and a set of setpoints combined with the HVAC control according to the setpoints.

To that end, some embodiments map the thermal states at the predetermined locations in the environment to the setpoints to control the HVAC system. In various implementations, the number of discrete locations at which the thermal states are controlled is greater than a number of setpoints. In such a manner, the controlling of the HVAC system can include the thermal states in the environment without considering uniformity assumption of well-mixed temperature and/or velocity distribution in the environment, while maintaining computational complexity of controlling the HVAC system that uses such an assumption.

Some embodiments are based on recognition that the mapping between the thermal states at the predetermined locations and the setpoints needs to be determined such that when the operation of HVAC system achieves the mapped setpoints, the thermal states in the fixed location approach target thermal states. Some embodiments are based on recognition that the mapping between the HVAC set points and the thermal states is complex and highly non-linear, but can be learned from data rather than analytically derived. According to an embodiment, such a mapping is learned by training the neural network. The neural network is trained from data including the thermal states that are measured by sensors arranged at the predetermined locations in the environment and the setpoints of the HVAC system.

However, designing and training of such a neural network poses a number of challenges. By way of example, in any given environment with M sensors and N HVAC units, at steady state, there exists a function that maps a forward (causal) relationship in the data from the setpoints of N HVAC units to measurements of M sensors. However, in addition to the forward relationship, for this problem we also need a model of the reverse of the forward relationship, i.e., an inverse relationship/inverse mapping that maps the sensors measurements to the HVAC setpoints. Training an invertible relationship is more difficult than training a predictive forward model. Additionally, the mapping depends on a number of other parameters that are difficult to measure and may significantly complicate the training and accuracy of the inverse mapping. For example, the mapping depends on outside temperature, which may complicate the training. The mapping also depends on configuration of the environment, which reduces transferability of the trained mapping. Furthermore, the mapping depends on heat load that the HVAC system needs to transfer, which is difficult to estimate. Therefore, the relationship, particularly in invertible form, is difficult to learn due to the aforementioned factors.

Additionally, or alternatively, some embodiments are based on recognition that collecting steady-state data which is optimal for learning an invertible relationship is both time consuming and requires further thermodynamic modeling. Hence, even if some implementations are arranged to condition tightly controlled environments, such as an office, there exists thermodynamic transients in the data which means that learning a single invertible model may not be practical even to capture the relative inverse relationship. To address this problem, some embodiments learn two models. In a forward direction, some embodiments learn a thermal sensor model that maps the HVAC setpoints to resulting thermal state. In an inverse direction, some embodiments learn a thermal setpoint model that maps the current thermal state to an estimate of the HVAC set points.

Some embodiments are based on realization that aforesaid models can be learned using the neural network having the autoencoding architecture. According to an embodiment, the autoencoding architecture includes an encoder and a decoder connected with a latent layer corresponding to the HVAC setpoints, such that the encoder connects the thermal states to the HVAC setpoints while the decoder connects the HVAC setpoints with the thermal states. In such a manner, the relative forward and inverse relationship can be learned without fixing any model and even with presence of transient measurements in the training data. This latter point is an additional benefit of the autoencoding architecture. Because when some transient data may exist in the measurements, learning the predictive thermal set point and thermal sensor models is not trivial. The autoencoding architecture allows us to learn both models simultaneously while identifying on average over the whole training dataset the best HVAC set points that result in the discretized thermal states.

Additionally, or alternatively, some embodiments are based on recognition that to learn the thermal sensor model and the thermal setpoint model together in the autoencoding architecture, there is a need to augment an autoencoding loss function with a term minimizing the deviation of the embedding from the current HVAC setpoints. To that end, in some embodiments, a loss function used to train the neural network includes a reconstruction loss to reduce an error in reconstructing inputs and an embedding loss to reduce deviation of embedding from physically observed HVAC set points. In such a manner, the embedding loss allows to formulate the target HVAC setpoints in a differentiable manner suitable for the training. In addition, in such a manner the loss function is a method of latent space design for the autoencoding architecture that specifically designs the latent space to be the space of HVAC set points.

In addition, some embodiments are based on recognition that it is advantageous to train or update the trained neural network periodically using data collected during operation of the HVAC system. In such a manner, the neural network can adapt to configuration of the environment and/or to a number of the occupants and locations of the occupants in the environment.

According to some embodiments, the target thermal states at the predetermined locations are designed parameters. For example, target values of the target thermal states can be preselected by a user. However, even for such a preselected approach, some embodiments are based on realization that discretizing thermal state of the environment adds flexibility in maintaining individual thermal comfort of the occupants in the environment. Such a realization is beneficial because different occupants can be associated with different locations which allows selecting different target thermal state for different locations and/or emphasizing locations associated with greater number of the occupants, and/or deemphasizing locations not associated with any occupant. To that end, a weight is associated with each of the predetermined locations in the environment, explicitly or implicitly, each user contributes to the loss function. The weight of the predetermined location depends on a number of the occupants associated with the predetermined location. Thus, the reconstruction loss is a combination of reconstruction losses for each of the predetermined location. In some embodiments, when multiple users are present at a sensor the desired temperature is the average of the user temperatures.

According to an embodiment, the target thermal states at the predetermined locations are determined based on personalized thermal comfort models. Additionally, some embodiments aim to minimize burden of providing feedback on the occupants in learning the personalized thermal comfort models. To that end, some embodiments use a weakly supervised approach for learning the personalized thermal comfort models. The weakly supervised approach includes learning a thermal comfort model using synthetic labeled data based on a general rule or external authority. Further, the thermal model learned using a weakly supervised approach is adapted using feedback provided by each occupant to learn the personalized thermal comfort models.

Some embodiments are based on recognition that the thermal setpoint model estimates the HVAC setpoints that have caused observed sensors measurements. However, additionally, it is an object of some of some embodiments to predict the HVAC set points that maximize the occupants' comfort. To that end, some embodiments aim to learn a control law that maximizes comfort probability of all the occupants. Some embodiments are based on realization that the thermal sensor model and the thermal setpoint model can be combined to learn the control law. To learn the control law, at first, the personalized thermal comfort models of the occupants are used to determine the optimal temperature of each occupant. The personalized thermal comfort models are used by sampling uniformly from the set of possible environment conditions, and selecting a point with the highest probability of comfort for each occupant.

According to some embodiments, for learning the control law, the control law is initialized with the thermal setpoint model. In particular, the control law is warm started with the thermal setpoint model. Some embodiments are based on realization that training of the control law is accomplished by fixing the thermal sensor model and tuning the control law. The control law is tuned using a loss function that penalizes deviations from optimal occupant temperature at each occupant's location. In an alternate embodiment, to learn the control law, the control law is defined as the thermal setpoint model with an additional linear layer of dimension N added to the output of the thermal setpoint model. The thermal sensor model and the thermal setpoint model are fixed, and training is performed on the additional linear layer using the loss function used for the tuning. Such an approach for learning the control law is advantageous because there are many fewer model parameters to learn, resulting in a model that can be efficiently learned with few training data samples. Some embodiments are based on recognition that the thermal set point model is nearly correct because most users near their comfortable state. Only small changes to the model need to be made to such that the control law outputs HVAC set points that make the users comfortable instead of set points that were physically observed by the sensors in the room.

According to some embodiments, the control law can also be learned via optimization. Such is the case when frequent changes in the seating arrangements of the occupants require continuous relearning of the control law as specified above. In such cases, it may be computationally more advantageous to instead determine the HVAC set points as solutions to an optimization function. Here the thermal set point model is used to provide the start point of the optimization, and the thermal sensor model is used to predict the state of the room as a function of the optimization solutions. Error is evaluated with the same loss function over the occupant locations and the desired thermal state of the occupants.

Accordingly, the choice between learning a model of the control law and using online optimization depends on the number of seating arrangement changes by the occupants. For occupants in fixed seating position it is computationally efficient to learn one control law that provides a computationally cheap method of predicting the comfortable set points. In contrast, when occupants are dynamically moving, the optimization approach provides a method of obtaining the desired set points without learning a control law for a transient spatial distribution of the occupants. It is contemplated that the two approaches can be used together. For example, the initial modelled control law approach is deployed over the fixed seating area of the workers. When workers meet for meetings, possibly in a separate office, the optimization problem can be solved online to provide an immediate set of HVAC set points for this meeting.

Accordingly, one embodiment discloses a controller for controlling a heating, ventilating, and air-conditioning (HVAC) system arranged to condition an environment according to HVAC setpoints, comprising: at least one processor; and memory having instructions stored thereon that, when executed by the at least one processor, cause the controller to: accept target thermal states at predetermined locations in the conditioned environment, current thermal states at the predetermined locations in the conditioned environment, and current HVAC setpoints; determine, using a neural network or by solving an optimization problem, target HVAC setpoints such that a difference in an operation of the HVAC system according to the target HVAC setpoints with respect to the operation of the HVAC system according to the current HVAC setpoints changes thermal states in the predetermined locations in the conditioned environment from the current thermal state to the target thermal state; and produce and submit control commands to components of the HVAC system to operate according to the target HVAC setpoints.

Accordingly, another embodiment discloses a method for controlling. A method for controlling a heating, ventilating, and air-conditioning (HVAC) system arranged to condition an environment according to HVAC setpoints, wherein the method uses a processor coupled to a memory storing instructions, the processor is coupled with stored instructions when executed by the processor carry out steps of the method, comprising: accepting target thermal states at predetermined locations in the conditioned environment, current thermal states at the predetermined locations in the conditioned environment, and current HVAC setpoints; determining, using a neural network, target HVAC setpoints such that a difference in an operation of the HVAC system according to the target HVAC setpoints with respect to the operation of the HVAC system according to the current HVAC setpoints changes thermal states in the predetermined locations in the conditioned environment from the current thermal state to the target thermal state; and producing and submitting control commands to components of the HVAC system to operate according to the target HVAC setpoints.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7 illustrates controlling of the HVAC system using the controller to achieve thermal comfort of the occupants, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
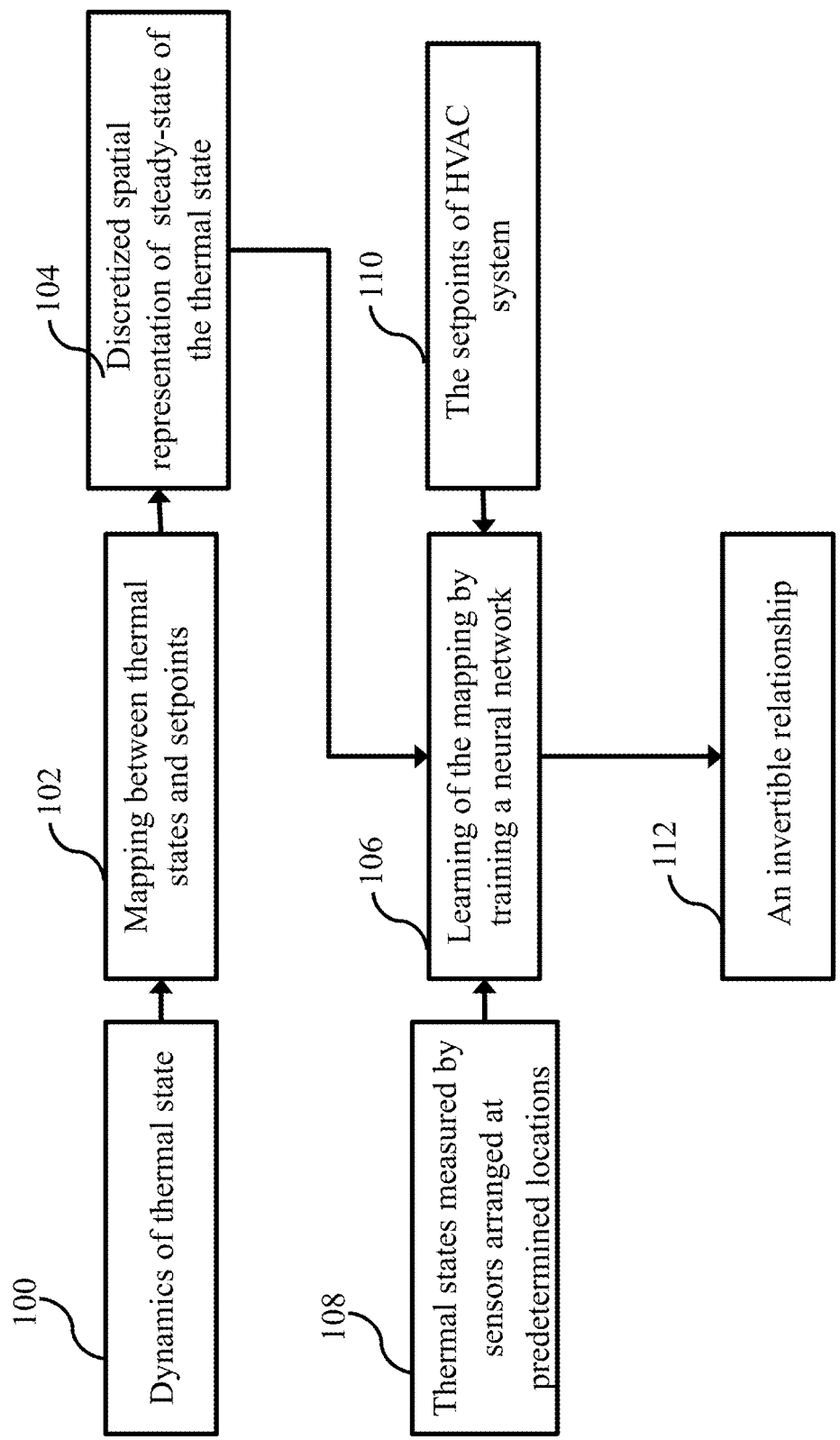
FIG. 1A shows a schematic overview of principles for controlling a heating, ventilating, and air-conditioning (HVAC) system arranged to condition an environment, according to some embodiments.

FIG. 1A shows a schematic overview of principles used by some embodiments for controlling a heating, ventilating, and air-conditioning (HVAC) system arranged to condition an environment. The environment may be a room or space of a building, or the whole building where the HVAC system is installed. In some embodiments, the environment may correspond to a space of the building where occupants are located or reside. In various implementations, the HVAC system may include multiple HVAC units installed to the environment. The HVAC system is configured to output air in the environment to condition the environment and ensure thermal comfort of the occupants of the environment. Thermal states of the outputted air include temperature and humidity of the air outputted by the HVAC system. In an alternate embodiment, the thermal state of the outputted air includes one or combination of the temperature, the humidity and velocity of the air outputted by the HVAC system to the environment.

It is an object of some embodiments to use neural networks to consider dynamics of the thermal state 100 in the environment to control the HVAC system without using a model of the thermal state. Some embodiments are based on recognition that a control of HVAC system which considers dynamics of the thermal 100 in the environment operates in a continuous spatial domain. For example, control commands to actuators of the HVAC system can vary continuously. Likewise, the thermal states, such as temperature, humidity, and/or velocity values, in the environment may vary continuously. Hence, there exists infinite number of values of the control commands and infinite number of spatially located thermal states in the environment. However, the neural network requires fixed numbers of inputs and outputs. To that end, replacing control of the HVAC system with a neural network trained in consideration of the thermal state is challenging.

Some embodiments are based on realization that there is no need to map the continuous distribution of the thermal states in the environment to continuous values of states of the HVAC actuators. Some embodiments are based on a recognition that, to operate the HVAC system, it is sufficient to map the values of the temperature, the humidity, and/or the velocity in the conditioned environment to setpoints that when reached achieve desired values of the thermal states at discrete locations in the environment. To that end, a mapping 102 between the thermal states in the environment and the set points of the HVAC system can be derived. As used herein, "setpoint" refers to a desired value of a variable of the HVAC system. The term setpoint is applied to any particular value of a specific set of control signals, and thermodynamic and environmental parameters. For example, the term "setpoint" may indicate a target value of temperature that the operation of the HVAC system needs to achieve at a specific location in the environment. Additionally, or alternatively, the term "setpoint" may indicate a specific state or states of components of the HVAC system.

However, as infinite number of points exists in the environment for which the thermal states can be estimated or measured, infinite dimensionality problem exists in such a mapping 102. Besides, the thermal states may change rapidly according to laws of thermodynamics.

To address this problem, discretized spatial representation of steady-state of the thermal state 104 is used. Some embodiments are based on realization that the mapping 102 between the thermal states in the environment and the setpoints to HVAC system can be considered for steady-state modeling of the thermodynamics of the environment. In contrast with full modeling which considers both transient and the steady-state of thermodynamics, the steady-state modeling can be accurately spatially discretized and, thus, the continuous thermal states in the environment can be represented with thermal states at fixed/predetermined locations in the environment. In such a manner, the discretized representation of the steady-state of thermal state 104 allows to address the infinite dimensionality problem. In other words, the spatially discretized representation of the steady-state of thermal state 104 allows transforming infinite mapping between the spatially continuous thermal states and the continuous values of HVAC actuators states to a finite mapping between discretized steady thermal states at a set of locations and a set of setpoints combined with HVAC control according to the setpoints.

To that end, some embodiments map the thermal states at the predetermined locations in the environment to the setpoints to control the HVAC system. In various implementations, the number of discrete locations at which the thermal states are controlled is greater than a number of setpoints. In such a manner, the controlling of the HVAC system can include the thermal state 100 in the environment without considering uniformity assumption of well-mixed temperature and/or velocity distribution in the environment, while maintaining computational complexity of controlling the HVAC system that uses such an assumption.

Some embodiments are based on recognition that the mapping between the thermal states at the predetermined locations and the setpoints needs to be determined such that when the operation of HVAC system achieves the mapped setpoints, the thermal states in the fixed location approach target thermal states. Some embodiments are based on recognition that such a mapping is highly non-linear and can be learned from data rather than deriving the mapping analytically According to an embodiment, such a mapping is learned by training the neural network 106. The neural network is trained from data including the thermal states that are measured by sensors arranged at the predetermined locations 108 in the environment and the setpoints of the HVAC system 110.

However, designing and training of such a neural network poses a number of challenges. For example, in any given environment with M sensors and N HVAC units, at steady state, there exists a function that maps a forward (causal) relationship in the data from the setpoints of N HVAC units to measurements of M sensors. However, in this case the desired mapping should be an invertible relationship, i.e., the mapping should also be invertible such that we learn the inverse relationship that maps the sensor measurements to the HVAC set points as well. The invertible relationship is more difficult to train than the simple predictive forward relationship. Additionally, the invertible mapping depends on a number of other parameters that are difficult to measure and may significantly complicate the training and accuracy of the inverse mapping. For example, the inverse mapping depends on outside temperature, which may complicate the training. The invertible mapping also depends on configuration of the environment, which reduces transferability of the trained mapping. Furthermore, the invertible mapping depends on heat load that the HVAC system needs to transfer, which is difficult to estimate. Therefore, the invertible relationship is difficult to learn due to the aforementioned factors.

To that end, some embodiments, instead of determining the inverse relationship between the sensor measurements and the HVAC setpoints, determine a relative inverse relationship 112 that maps a difference between current and target sensors measurements to a difference between current and target HVAC setpoints. Because the other parameters such as the outside temperature, the configuration of the environment and the heat load are same for current and target parameters of operation of the HVAC system. Also, considering such differences reduces effects of the other parameters on learning the relative inverse relationship 112.

Figure 1B:
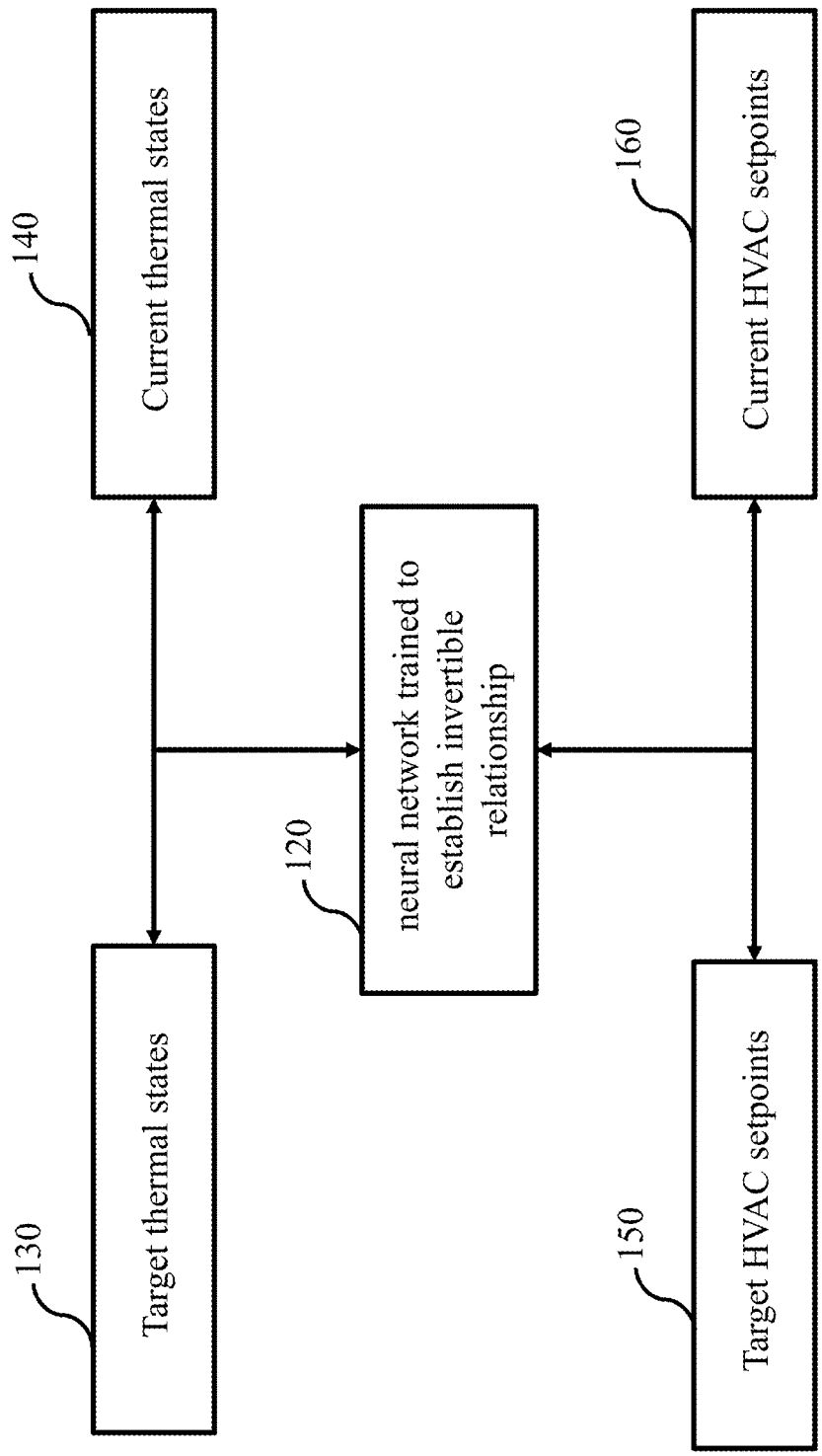
FIG. 1B shows a schematic of a neural network 120 trained to establish a mapping between thermal states at the predetermined locations and HVAC setpoints causing the thermal states according to some embodiments.

FIG. 1B shows a schematic of a neural network 120 trained to establish an invertible relationship between thermal states at the predetermined locations and HVAC setpoints causing the thermal states according to some embodiments. In some implementations, the invertible relationship is relative, such that the neural network determines target HVAC setpoints 150 such that a difference in an operation of the HVAC system according to the target HVAC setpoints 150 with respect to the operation of the HVAC system according to the current HVAC setpoints 160 changes the thermal states in the predetermined locations in the conditioned environment from the current thermal state 140 to the target thermal state 130. In such a manner, a controller that produces and submits control commands to components of the HVAC system to operate according to the target HVAC setpoints is able to achieve non-uniform distribution of target thermal states in conditioned environment without considering model of dynamics of thermal state.

Figure 2:
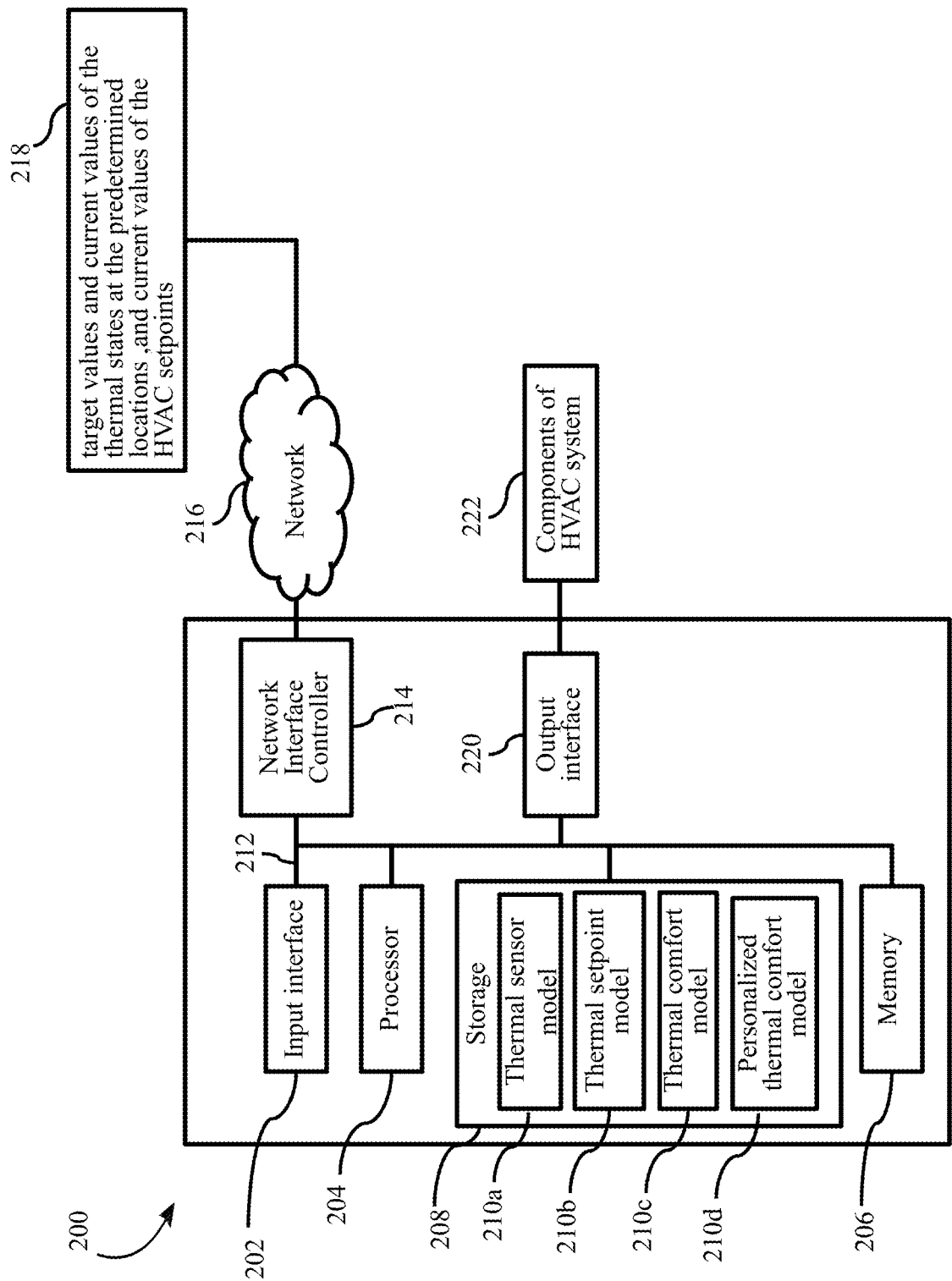
FIG. 2 shows a block diagram of a controller for controlling the HVAC system according to the HVAC setpoints, according to some embodiments.

FIG. 2 shows a block diagram of a controller 200 for controlling the HVAC system according to the HVAC setpoints, according to some embodiments. The controller 200 includes an input interface 202. The controller 200 is configured to accept target values of the thermal states at the predetermined locations in the environment conditioned by the HVAC system, current values of the thermal states at the predetermined locations in the conditioned environment, and current values of the HVAC setpoints, via the input interface 202.

The controller 200 can have a number of interfaces connecting the controller 200 with other systems and devices. For example, a network interface controller (NIC) 214 is adapted to connect the controller 200, through a bus 212, to a network 216 connecting the controller 200 with the operatively connected to a set of sensors. Through the network 216, either wirelessly or through wires, the controller 200 receives the target values and the current values of the thermal states at the predetermined locations in the conditioned environment, and the current values of the HVAC setpoints.

The controller 200 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices.

According to some embodiments, the instructions stored in the memory 206 implement a method for controlling the HVAC system according to the HVAC setpoints. To that end, the storage device 208 can be adapted to store different modules storing executable instructions for the processor 204. The storage device 208 can be implemented using a hard drive, an optical drive, a thumb drive, an array of drives, or any combinations thereof. The storage device 208 is configured to store a thermal sensor model 210a that maps the HVAC setpoints to corresponding thermal states. The storage device 208 is further configured to store a thermal sensor model 210b that maps the thermal states to the corresponding HVAC setpoints. The storage device 208 is further configured to store a standard comfort model 210c common to all the occupants. The standard comfort model 210c is used to determine personalized thermal comfort models of the occupants. The storage device 208 is further configured to personalized thermal comfort model 210d of each occupant, which determines optimal temperature of each occupant.

In some embodiments, the controller 200 is configured to determine, using the neural network and/or by solving an optimization problem, target HVAC setpoints such that such that when the HVAC system operates according to the target HVAC setpoints, the current thermal state in the predetermined locations changes the target thermal state. The controller 200 is further configured to produce control commands for components of the HVAC system to operate according to the target HVAC setpoints.

Further, the controller 200 includes an output interface 220. In some embodiments, the controller 200 is further configured to submit, via the output interface 220, the control commands to the components of the HVAC system 222 to operate according to the target HVAC setpoints. The control commands may change states of actuators of the HVAC system. Examples of the states of the actuators include a speed of a compressor of the HVAC system, positions of various valves, rotation position of air louvers directing exhaust air, and the like.

In an embodiment, the environment corresponds to an indoor space occupied by K occupants for an extended period of time, for example, a shared office with assigned desks. The indoor space is equipped with N HVAC units distributed over the indoor space and with M sensors located at the predetermined locations that can measure the temperature and the humidity. In some implementations, M sensors located at the predetermined locations can also measure air velocity of the outputted air in the indoor space.

Let $i \in 1, \ldots, M$ denote one sensor and its location in the indoor space. $x_i(t)=[x_{T,i}(t), x_{H,i}(t)] \in R^2$ denote measurement of the $i^{th}$ sensor at time t, called the thermal state, where $x_{T,i}(t)$, and $x_{H,i}(t)$ are the temperature and humidity measurements, respectively. The thermal state of the indoor space is denoted by $X(t)=[x_1(t), \ldots, x_M(t)]^T \in R^{2M}$. The thermal state perceived by $k^{th}$ occupant, $\in 1, \ldots, K$, is approximated by measurements of the closest $i^{th}$ sensor. An optimal temperature of occupant k at location i is denoted by $x^*_{T,k,i}$. A vector of optimal temperatures desired by the occupants is denoted as $X^*_T$.

It is assumed that each occupant can provide feedback regarding their perceived thermal comfort, by changing the temperature setpoint of an appropriate (specific) HVAC unit. In an embodiment, the occupant may provide the feedback via a thermostat. For example, the occupant may provide the feedback by adjusting the temperature setpoint associated with the thermostat. In an alternate embodiment, the occupant may provide the feedback using a user equipment such as remote controller of the HVAC system. Further, by associating the occupant's feedback with the measurement of the closest sensor, the thermal comfort of the occupant, i.e., if the occupant feels hot, cold, or comfortable at that time instant can be determined. Let $j \in 1, \ldots, N$ denote a given HVAC unit, and $h_j(t) \in R$ denotes the temperature set point of the $j^{th}$ HVAC unit at time t. A vector of set points for all the HVAC units is denoted as $H(t)=[h_1(t) \ldots, h_N(t)]^T$.

Some embodiments are based on recognition that in the indoor space, at steady state, there exists a function $X(t)=g(H(t))$ that maps the forward (causal) relationship in the data from the HVAC set points to the measurements of the sensors arranged in the indoor space. In addition, there exists a function $H(t)=g^{-1}(X(t))$ that maps the inverse relationship, $g^{-1}$, in the data from the measurements of the sensors to the HVAC set points. An invertible model g is learned from data of the steady-state. However, collecting the steady-state data for training is both time consuming and requires further thermodynamic modeling. Hence, even if the HVAC system is arranged to condition tightly controlled environments, such as an office, thermodynamic transients exist with the steady-state data. In other words, learning the invertible model might not be practical to capture the relative inverse relationship. To address this problem, some embodiments learn two models, namely, a thermal sensor model and a thermal setpoint model.

In a forward direction, some embodiments learn the thermal sensor model which maps the HVAC setpoints to corresponding thermal state X:

$$\hat{X}(t)=f_{sensor}(H(t)). \quad (1)$$

To that end, the forward relationship is learned by the thermal sensor model. In an inverse direction, some embodiments learn the thermal setpoint model which maps the thermal state to an estimate of the HVAC set points:

$$\hat{H}(t)=f_{setPts}(X(t)). \quad (2)$$

To that end, the inverse relationship is learned by the thermal setpoint model.

Some embodiments are based on realization that the aforesaid models can be learned using the neural network, as the functions $f_{sensor}$ and $f_{setPts}$ are non-linear and non-convex. In particular, due to symmetry in the aforesaid models and the number of HVAC set points N is less than the number of sensors M, N<M, some embodiments are based on realization that the aforesaid models can be learned using the neural network having an autoencoding architecture.

Figure 3A:
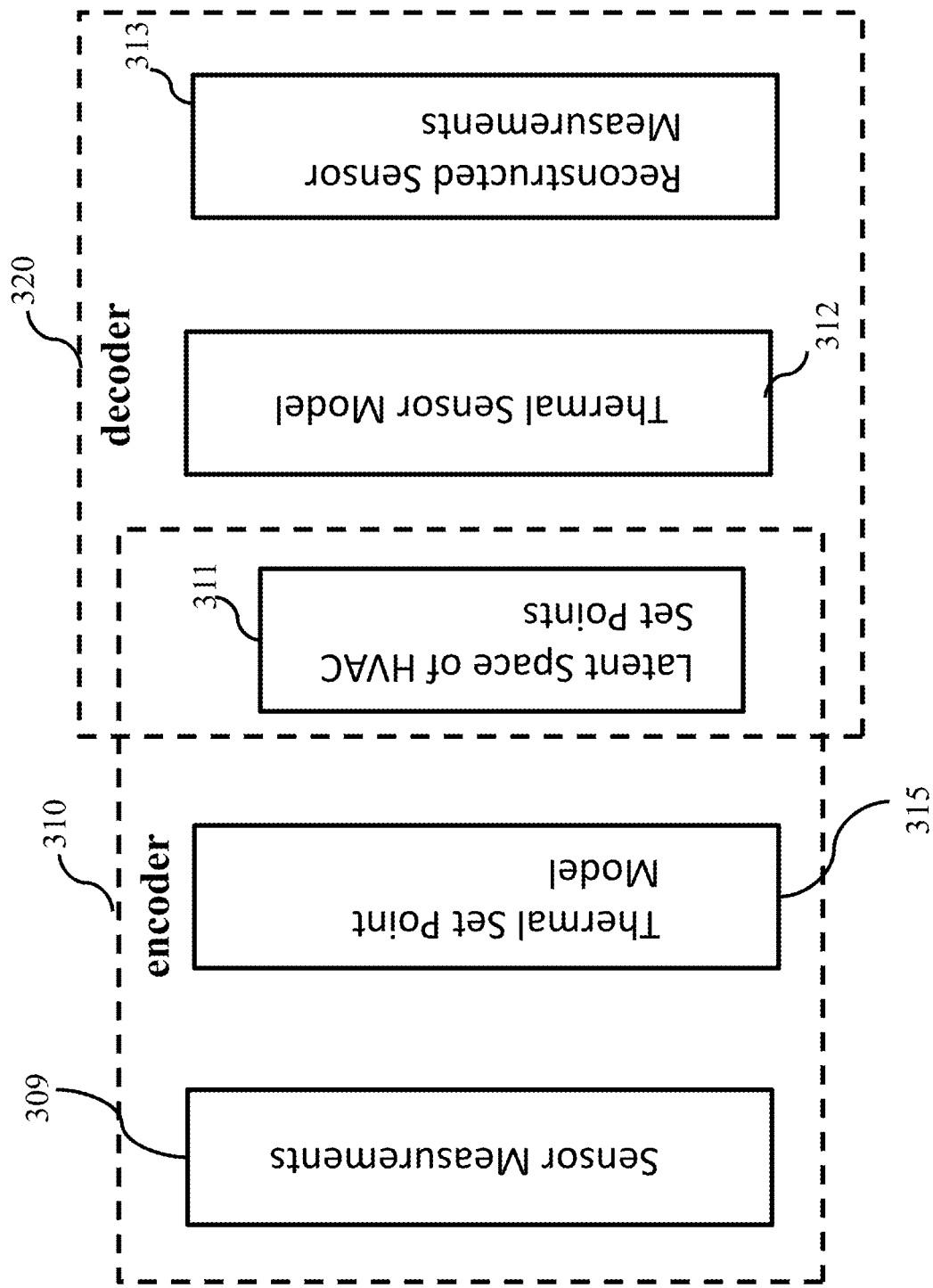
FIG. 3A and FIG. 3B show an autoencoding architecture for learning a thermal sensor model and a thermal setpoint model, according to some embodiments.

FIG. 3A shows a block diagram of an autoencoder for weakly supervised modeling of the inverse relationship according to some embodiments. An autoencoder is a type of artificial neural network used to learn efficient data coding in an unsupervised manner. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name.

To that end, in some embodiments, the neural network trained to establish an invertible relationship between thermal states at the predetermined locations and HVAC setpoints causing the thermal states has autoencoding architecture having an encoder 310 and a decoder 320 connected with a latent layer 311 corresponding to the HVAC setpoints. The encoder 310 forms the thermal setpoint model 315 that connects the thermal states 309 measured at the predetermined locations to the HVAC setpoints 311 while the decoder 320 forms the thermal sensor model 312 that connects the HVAC setpoints 311 with the thermal states 313 reconstructed by the decoder.

Notably, the thermal sensor model 312 of the decoder 313 is the forward, i.e., causal, model, while the thermal setpoint model 315 is an inverse model. However, these two models can be learned together in an unsupervised manner from the training data based on training data including measurements of the thermal states 309 and the predetermined locations and measurements of the HVAC setpoints 311 causing the measurements of the thermal states 309. In such a manner, the encoder and the decoder of the trained neural network represent the encoder and the decoder of a physically observed thermal model.

Figure 3B:
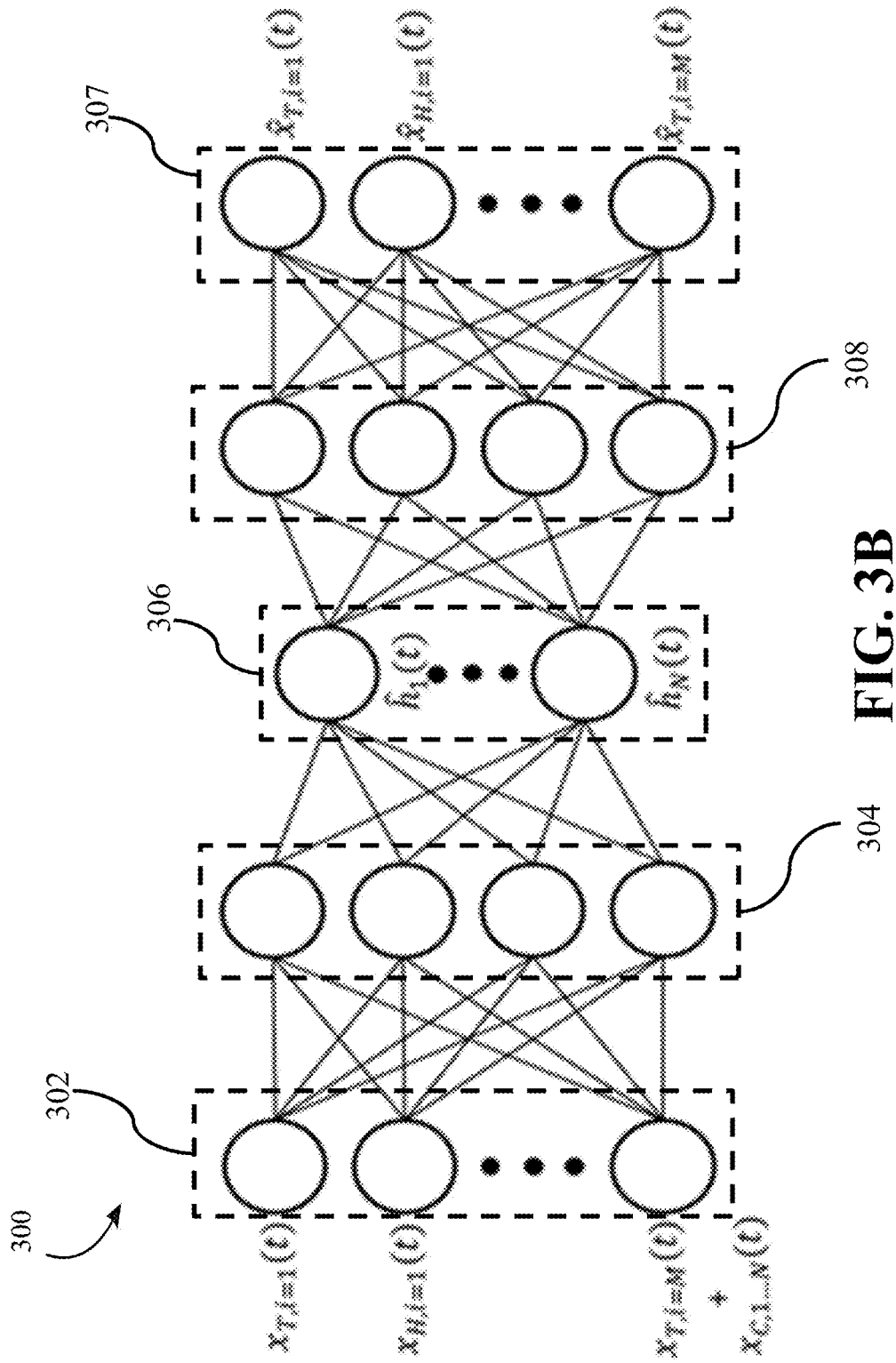

FIG. 3B shows an examplar autoencoding architecture 300 for learning the thermal sensor model and the thermal setpoint model, according to some embodiments. The thermal sensor model 312 and the thermal setpoint model 315 are linked in the autoencoding architecture 300. Both the thermal sensor model and the thermal setpoint model can be trained using the autoencoding architecture 300 where $$\hat{X}(t)=f_{sensor}(f_{SetPts}(X(t))). \quad (3)$$

The autoencoding architecture 300 includes an encoder and a decoder. The encoder and the decoder correspond to the thermal sensor model and the thermal setpoint model, respectively. An input layer 302 of the encoder corresponds to the thermal state of the indoor space, X(t), determined by the measurements of the sensors at the predetermined locations. Further, the autoencoding architecture 300 includes hidden layers 304 includes a tunable group of layers with non-linear activation functions. The encoder is connected to a latent layer 306 corresponding to the HVAC setpoints, via the hidden layers 304. The latent layer 306 has a dimension equal to a number of the HVAC setpoints, and represents the learned set point for each HVAC unit, $h_j$.

Further, the autoencoding architecture 300 includes hidden layers 308 configured to translate the latent layer's 306 output into an estimate of the thermal state of the indoor space, $\hat{X}$. The decoder is also connected to the latent layer 306. An output layer of the 310 corresponds to the estimate of the thermal state of the indoor space. To that end, the encoder and the decoder are connected with the latent layer 306 such that the encoder connects the thermal states to the HVAC setpoints while the decoder connects the HVAC setpoints with the thermal states. In other words, the autoencoder architecture 300 involves reconstruction of the inputs (the sensors measurements) such that the outputs match the inputs, while the HVAC setpoints are the latent layer 306.

In some implementations, the neural network having the autoencoding architecture 300 is learned off-line (i.e., trained in advance) and in an unsupervised manner. In other words, the learning of the thermal sensor model and the thermal setpoint model is carried out offline, without the need for a human expert. The input layer 302 and the output layer 310 have a dimension equal to the number of the predetermined locations (or sensor measurements). In an alternate embodiment, as shown in FIG. 3B, the inputs can be augmented using HVAC state conditions such as fan on/off state, fan speed, and the like. Such HVAC state conditions are denoted by $x_{C,j}(t)$.

Additionally, or alternatively, some embodiments are based on recognition that to learn the thermal sensor model and the thermal setpoint model together in the autoencoding architecture 300, there is a need to augment an autoencoding loss function with a term minimizing deviation of embedding from the current HVAC setpoints. The augmentation of the autoencoding loss function designs the latent space such that the latent space represents the space of HVAC set points. To that end, in some embodiments, a loss function used to train the neural network includes a reconstruction loss to reduce an error in reconstructing the inputs and an embedding loss to reduce deviation of the embedding from physically observed HVAC thermostat set points. In such a manner, the embedding loss allows the formulation the target HVAC setpoints in a differentiable manner suitable for the training. The loss function used to train the neural network is denoted as $\mathcal{L}_T(t)$, where $\mathcal{T}$ denotes that the loss function is an approximation of static thermodynamic relationships. The loss function is given by $$\mathcal{L}_T(t) = \sum_{i=1}^{M} (\hat{x}_{T,i}(t) - x_{T,i}(t))^2 + (\hat{x}_{H,i}(t) - x_{H,i}(t))^2 + \sum_{i=1}^{N} (\hat{h}_j(t) - h_j(t))^2 \quad (4)$$

The first term in (4) corresponds to the reconstruction loss on X(t) and second term in (4) corresponds to the embedding loss on H(t).

Additionally, some embodiments are based on recognition that it is advantageous to train or update the trained neural network periodically using data collected during the operation of the HVAC system (i.e. runtime of the HVAC system). In such a manner, the neural network can adapt to configuration of the environment and/or to a number of occupants and locations of occupants of the environment. To that end, in some embodiments, usage of the neural network is staged, such that the neural network is used/trained differently in different stages.

Figure 4:
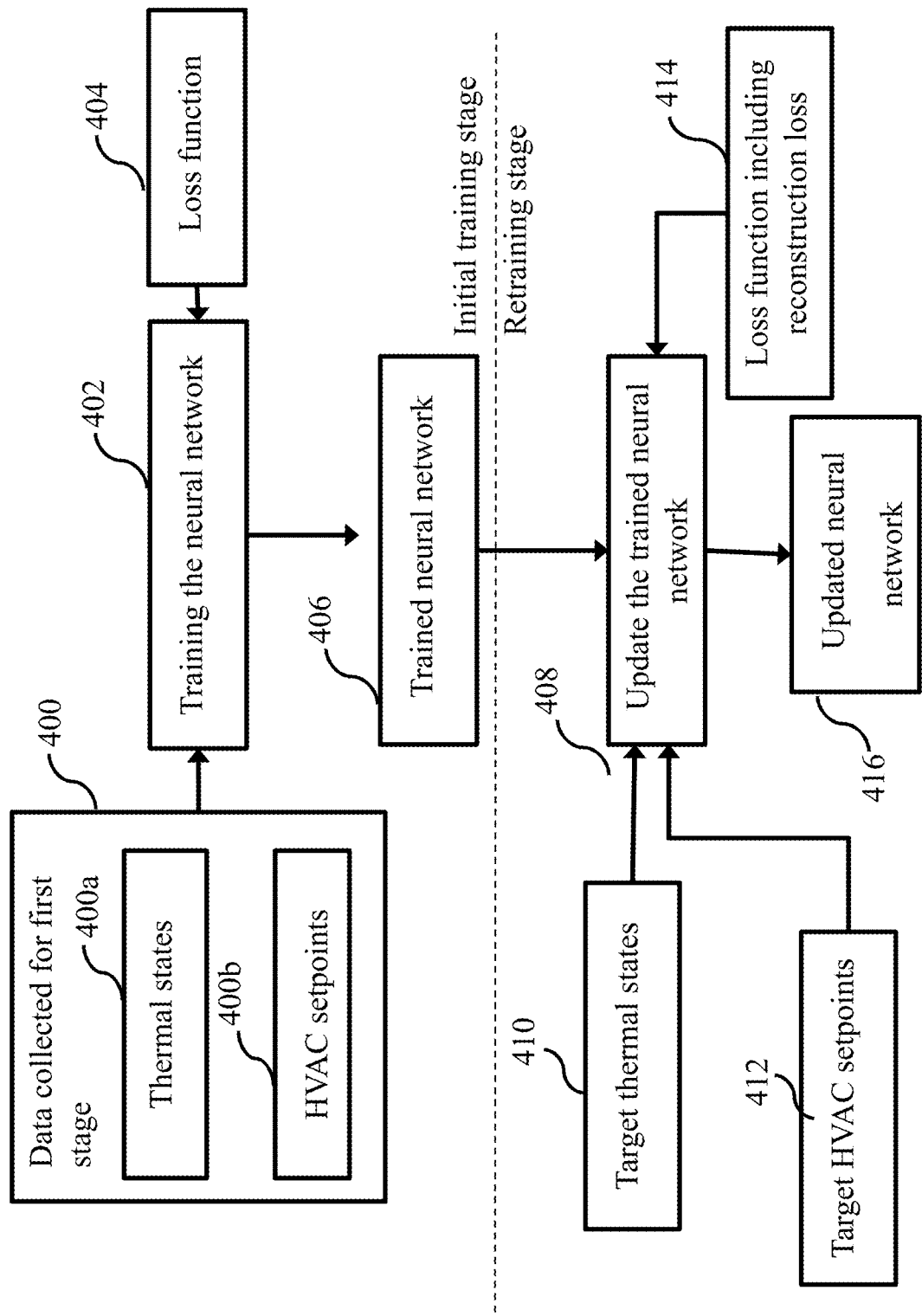
FIG. 4 shows a schematic of stages of training a neural network, according to some embodiments.

FIG. 4 shows a schematic of different stages in training the neural network, according to some embodiments. In an initial training stage, the neural network having the autoencoding architecture 300 is trained 402 based on data collected 400 which includes corresponding thermal states 400a and HVAC setpoints 400b values. According to an embodiment, the objective of the initial training stage is to train both the encoder and the decoder of the autoencoding architecture 300 to estimate/learn both the thermal sensor model and the thermal setpoint model in an unsupervised fashion. Further, during the initial training stage, a loss function 404, such as (4), is used to enforce that the encoder can inverse the thermal states into corresponding values of the HVAC setpoints which can be decoded forward into the corresponding values of the thermal states. To that end, a trained neural network 406 is obtained.

Some embodiments are based on a recognition that the neural network trained 406 during the initial training stage can be executed for target thermal states 410 to recover target HVAC setpoints 412. But such an execution might not result in the correct target set points because the desired temperatures at the discretized user locations may not have occurred in the training data set. Therefore, in retraining stage, some embodiments update 408 the trained neural network by retraining based on the target thermal states 410 and the target HVAC setpoints to obtain updated neural network 416. In particular, the embodiments retrain the autoencoding architecture 300 such that the encoder encodes the target thermal states 410 into the target HVAC setpoints 412 that can be decoded into the target thermal states 410 by the decoder. Further, for retraining the autoencoding architecture 300, a loss function 414 including the reconstruction loss is used to reduce a difference between the temperature measurements at the predetermined locations and target temperatures. In an alternate embodiment, for retraining the autoencoding architecture 300, the loss function including the reconstruction loss 414 is used to reduce a difference between the temperature and humidity measurements at the predetermined locations and target humidity values.

The updated neural network 416 determined by training the neural network in the different stages provide multiple advantages. For example, the updated neural network 416 is more accurate as the accuracy of the HVAC setpoints is enforced by the loss function 404 and the loss function 414 in the initial training stage and retraining stage, respectively. In addition, training the neural network in the different stages allows to vary dimensions of the input and output layers to consider only the thermal states at the locations associated with the occupants in the environment.

In some embodiments, the target thermal states at the predetermined locations are designed parameters. For example, target values of the target thermal states can be preselected by a user. However, even for such a preselected approach, some embodiments are based on realization that discretizing thermal state of the environment adds flexibility in maintaining individual thermal comfort of the occupants in the environment. Such a realization is true as different occupants can be associated with different locations which allow selecting different target thermal state for different locations and/or emphasizing locations associated with greater number of the occupants, and/or deemphasizing locations not associated with any occupant.

To that end, a weight is associated with each of the predetermined locations in the environment. The weight of the predetermined location depends on a number of the occupants associated with the predetermined location. Thus, the reconstruction loss is a combination of reconstruction losses for each of the predetermined location. The processor 204 is further configured to receive locations of the occupants in the environment and associate the occupants with their closest predetermined locations. When the users are sitting at fixed room locations this location can be provided by simply providing the sensor number which is closest to a given user. When the location of the occupants is dynamic it may be determined by indoor positioning systems that are based on distance measurement to nearby anchor nodes (nodes with known fixed positions, e.g. Wi-Fi access points or Bluetooth beacons), magnetic positioning, grid concepts, or dead reckoning.

According to an embodiment, the target thermal states at the predetermined locations are determined based on personalized thermal comfort models. Additionally, some embodiments aim to minimize burden of providing feedback on the occupants in learning the personalized thermal comfort models. To that end, some embodiments use a weakly supervised approach for learning the personalized thermal comfort models.

Figure 5A:
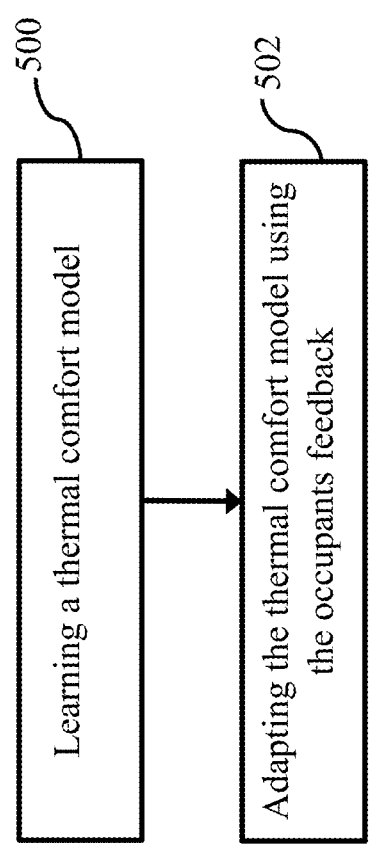
FIG. 5A shows a schematic of a weakly supervised approach for learning personalized thermal comfort models, according to some embodiments.

FIG. 5A shows a schematic of the weakly supervised approach for learning the personalized thermal comfort models, according to some embodiments. For the $k^{th}$ occupant, associated with the $i^{th}$ sensor, there exists an unknown function, $y_c^{k,i} = \tilde{f}^{k,i}(\tilde{x}_i)$ that maps the occupant's thermal state, $\tilde{x}_i(t)$ at time t, to the occupant's personal probability of comfort, $y_c^{k,i} \in (0, 1)$ at time t. In practice, the occupant's thermal state $\tilde{x}_i(t)$ is defined by a set of parameters that includes age, gender, metabolic rate, ethnicity, clothing, and the like. As many of the parameters of the set of parameters are not measurable, it is difficult to learn $\tilde{f}$. However, some embodiments are based on recognition that the measurable quantities $x_i$ (0 can be used to learn an approximation to $\tilde{f}$:

$$y_c^{k,i} = f^k(x_i(t)). \tag{5}$$

The weakly supervised approach includes learning a thermal comfort model $f^0$ 500 using labeled data. Further, the weakly supervised approach includes adapting 502 the standard comfort model using the feedback provided by each occupant to learn the personalized thermal comfort models. The personalized thermal comfort model for the $k^{th}$ occupant is denoted as $f^k$.

The standard comfort model, $f^0$, common to the occupants, is learned using the labeled data sampled uniformly over a space of possible temperature and humidity values that can be measured in the environment. Labels for the labeled data are derived from ranges of the temperature and the humidity that are contemplated as comfortable for the occupants. If a given temperature and humidity data point falls within such ranges, then it is labeled as comfortable. Otherwise, the data point is labeled as uncomfortable.

Figure 5B:
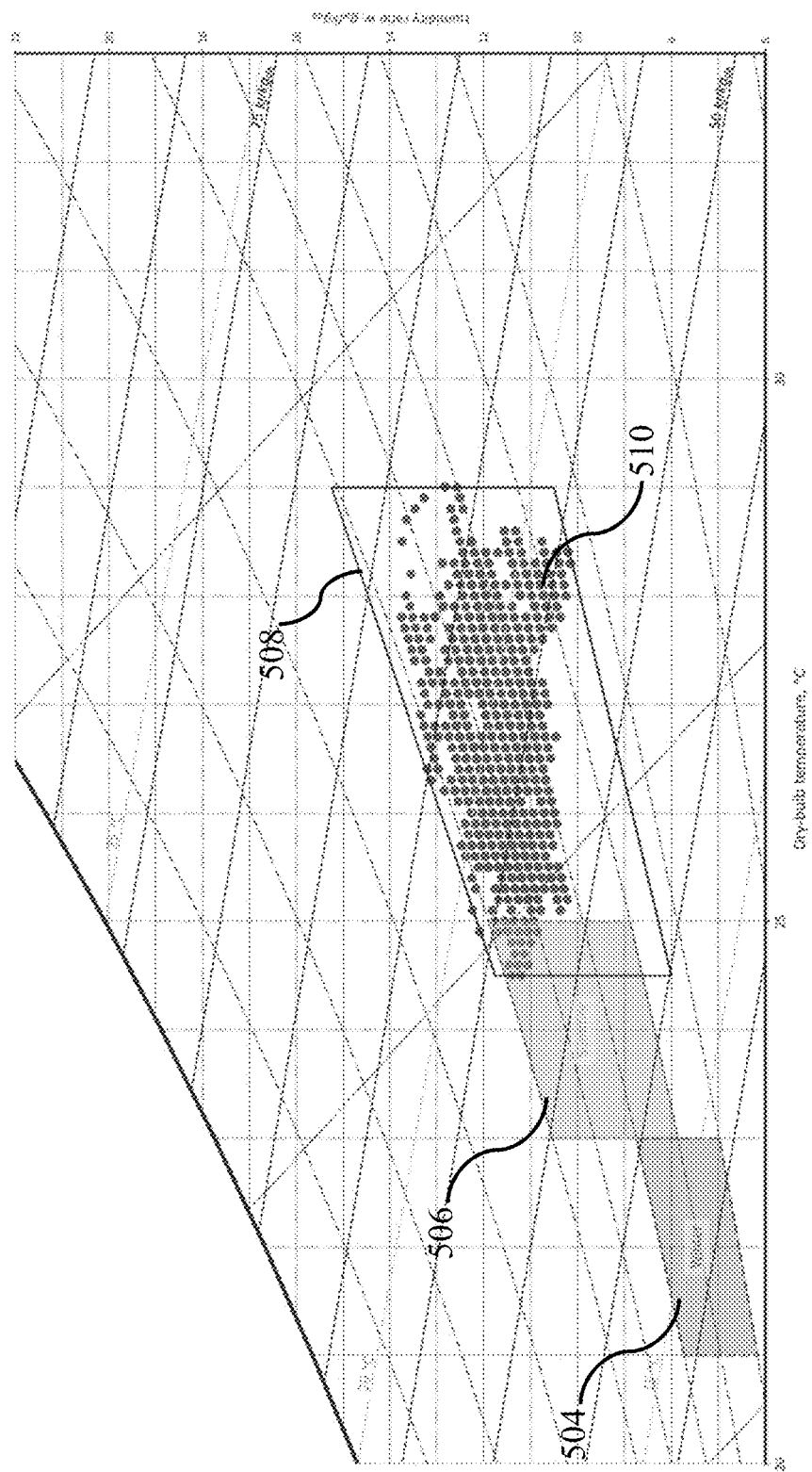
FIG. 5B shows an exemplary psychometric chart depicting comfortable zones, according to some embodiments.

In an embodiment, the ranges of the temperature and humidity values are determined from comfortable zones determined by professionals associations. For example, psychometric charts showing the comfortable zones are published by such as American Society of Heating, Refrigerating and Air-Conditioning Engineers (ASHRAE). Such psychometric charts are utilized to determine the ranges of the temperature and the humidity values. FIG. 5B shows an exemplary psychometric chart depicting the comfortable zones, according to some embodiments. Rectangle 506 corresponds to a comfortable zone during winter season. Rectangle 508 corresponds to a comfortable zone during summer season.

In an alternate embodiment, the ranges of the temperature and the humidity values are determined by defining a zone 508 on the psychrometric chart that encompasses observed data points 510 at a location. The zone 510 is rectangular and bounded by observed $T_{min}$, $T_{max}$, $H_{min}$ and $H_{max}$. Some embodiments are based on realization that the rectangular zone 510 can be used to derive a structure of neural network that can be used to learn the standard comfort model, $f^0$, and the personalized thermal comfort model $f^k$.

Figure 5C:
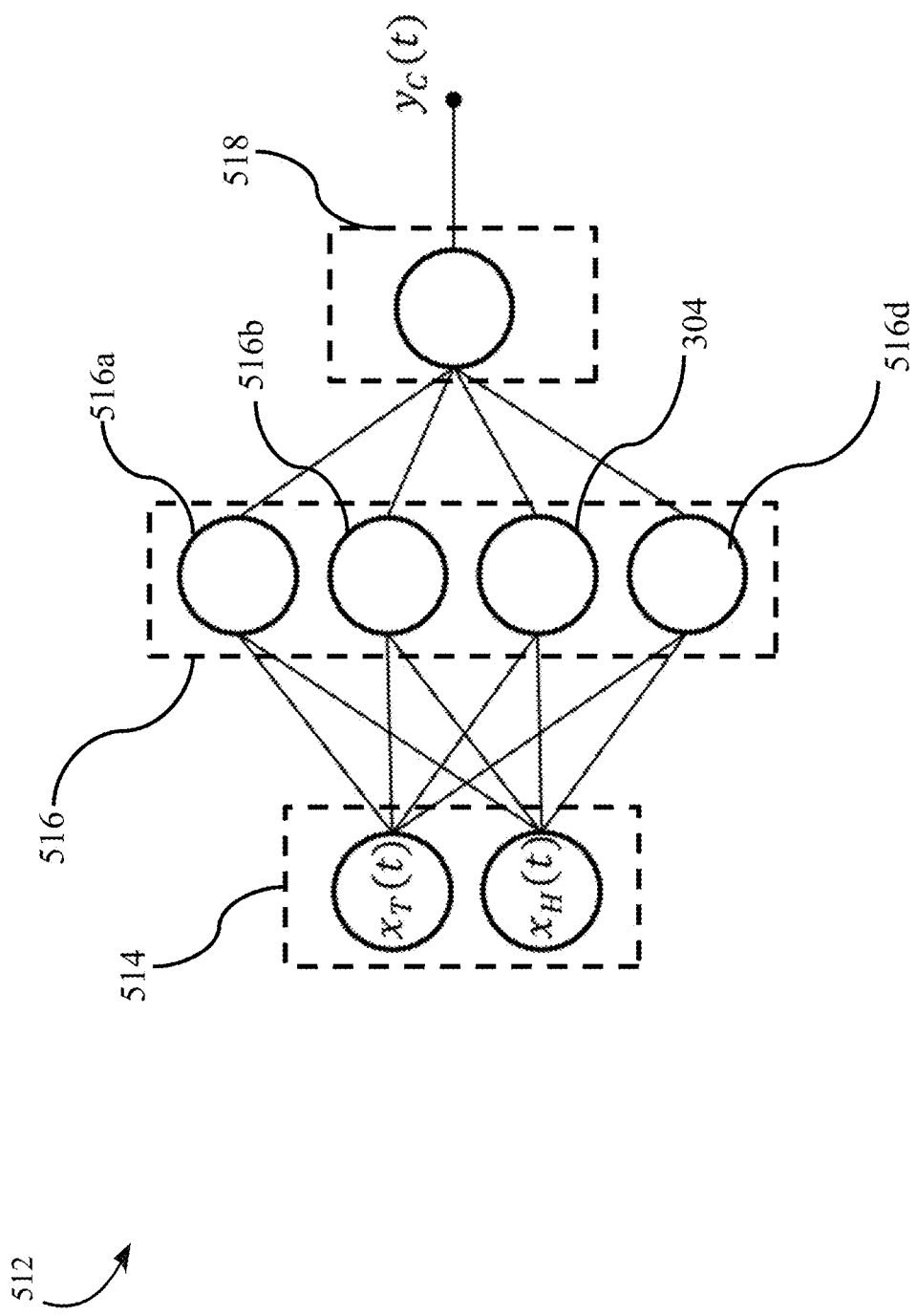
FIG. 5C shows a structure of a neural network to learn a standard comfort model and the personalized thermal comfort model, according to some embodiments.

FIG. 5C shows the structure of the neural network 512 that can be used to learn the thermal comfort model $f^0$, and the personalized thermal comfort model $f^k$, according to some embodiments. The neural network 512 includes an input layer 514, a hidden layer 516 and an output layer 518. The temperature $x_T(t)$ and humidity $x_H(t)$ measurements are input to the input layer 514. The hidden layer 516 includes four neurons 516a, 516b, 516c, and 516d. Each neuron learns a boundary on one side of the zone 508. For example, 516a learns a temperature boundary cold to comfortable, 516b learns a temperature boundary comfortable to hot, 516c learns a humidity boundary humid to comfortable, and 516d learns a humidity boundary dry to comfortable. Further, to interpret output of the models $f^0$ and $f^k$ as a probability, a sigmoid activation is applied to each neuron of the neural network 512. The neural network 512 outputs a probability of comfort) $y_c(t)$. The standard comfort model is learned by sampling uniformly over the space of possible temperature and humidity values, and labelling the samples using the boundaries of the zone 508.

Figure 5D:
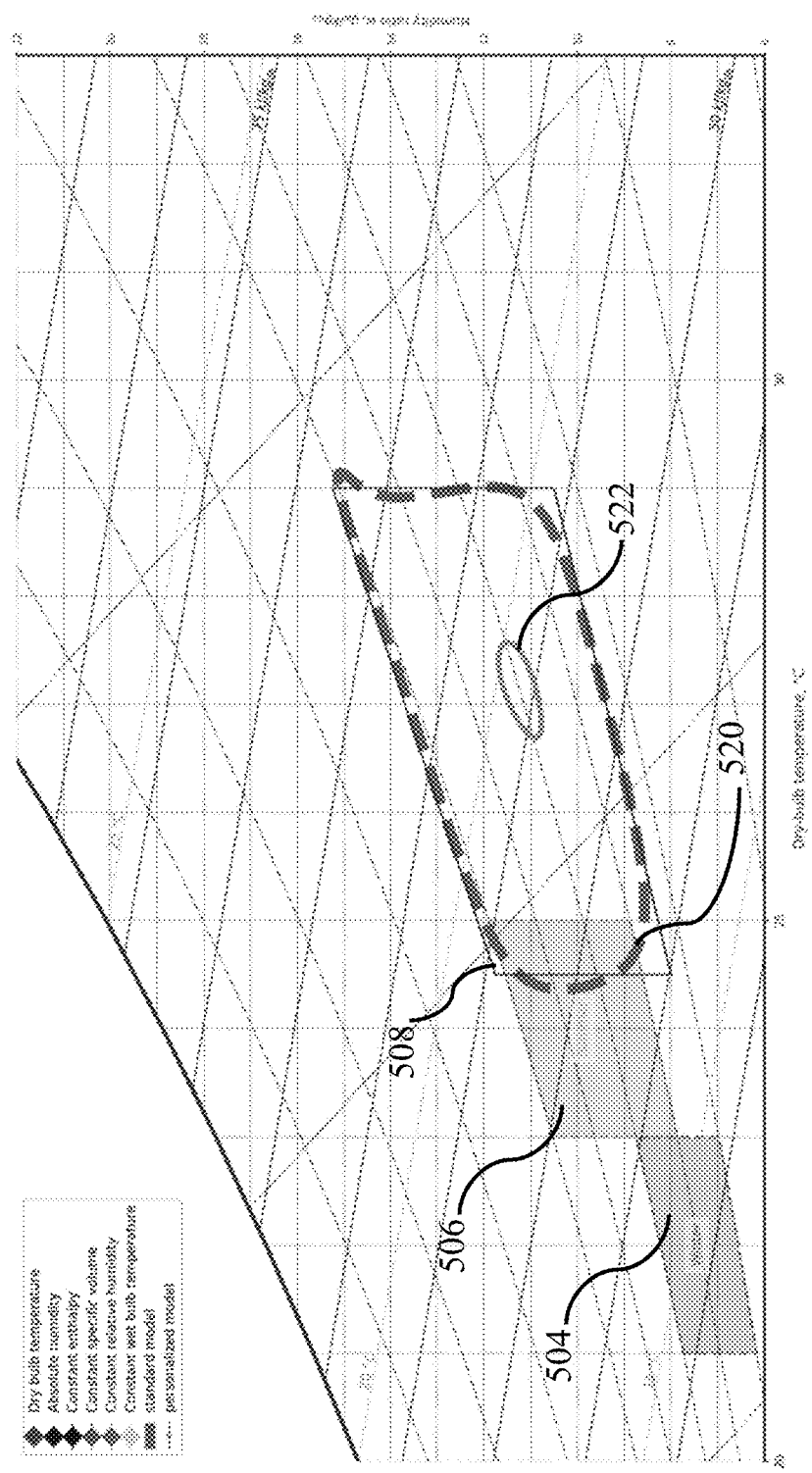
FIG. 5D shows a psychometric chart depicting a learned standard comfort model and one of level sets of the personalized thermal comfort model, according to some embodiments.

FIG. 5D shows a psychometric chart depicting the learned thermal comfort model and one of level sets of the personalized thermal comfort model, according to some embodiments. A shape 520 shown with dashed line represents the learned standard comfort model $f^0$. In particular, the dashed line of shape 520 is one of the level sets of the learned standard comfort model $f^0$. The level sets are sets of points at which the probability of comfort predicted by a function is same. For example, all points at which the probability as evaluated by the function is 0.5.

Further, to determine the personalized thermal comfort model $f^k$, the learned standard model $f^0$ is adapted for the occupant k when the occupant k provides the feedback by adjusting the $j^{th}$ HVAC unit's set point. For example, the occupant k may adjust $j^{th}$ HVAC unit's set point temperature. At this point, the occupant's thermal state $x_i(t)$ and the adjusted set point temperature $h_j$ (feedback) are observed and obtained. The setpoint adjusted by the occupant corresponds to the target HVAC setpoints. Some embodiments are based on recognition that each adjusted set point (feedback) yields multiple levels of information. For example, each adjusted set point (feedback) yields three levels of information. First, the occupant is uncomfortable in the current state $x_i(t)$. Second, the occupant is either hot or cold, depending on the direction in which the set point, $h_j$, is changed. Third, the occupant assumes that their optimal temperature might be $h_j$. From the aforementioned three levels of information, some embodiments use the third level information as it is not true that the target HVAC setpoints provided by the occupant is optimal, and the models $f^0$ and $f^k$ only determines the probability of comfort and not direction of discomfort. Therefore, when the occupant adjusts the HVAC setpoints, a labeled data is obtained that states that the occupant is uncomfortable in current conditions.

Further, the obtained labeled data is adapted into the standard comfort model $f^o$ using backpropagation on $f^o$, until the probability of comfort assessed at a present data point is below a threshold. Such a way of adopting results the personalized thermal comfort model $f^k$ of the $k^{th}$ occupant. The model $f^k$ is further updated as the occupant provides feedback. Furthermore, in an embodiment, it is assumed that at least during first year of exploitation of the model $f^k$, the model $f^k$ may be periodically learned from sets of recent feedbacks, leading to a collection of seasonal personalized thermal comfort models for the occupant k. An oval shape 522 represents the one of the level sets of the personalized thermal comfort model $f^k$. As shown in FIG. 5D, the personalized thermal comfort model $f^k$ encompasses a subset of the data encompassed by standard comfort model $f^o$ 520.

Some embodiments are based on recognition that the thermal setpoint model estimates the HVAC setpoints that have caused the observed sensors' measurements, however, additionally, it is an object of some of some embodiments to predict the HVAC set points that maximize occupants comfort. To that end, given the temperature $x^*_{T,k,i}$ for each occupant k, some embodiments aim to learn a control law $H^* = \pi(X^*_T)$ that maximizes comfort probability of all the occupants denoted by $y_c = [y_c^1, \ldots, y_c^k]^T$. Some embodiments are based on realization that the thermal sensor model and the thermal setpoint model can be combined to learn the control law. To learn the control law, at first, the personalized thermal comfort models of the occupants are used to determine the optimal temperature of each occupant. The personalized thermal comfort models are used by sampling uniformly from the set of possible environment conditions, and selecting a point with the highest probability of comfort for each occupant.

Various embodiments train the neural network based on training data including measurements of the thermal states and the predetermined locations and measurements of the HVAC setpoints causing the measurements of the thermal states. Because the training data include actual measurements, trained neural network forms the encoder and the decoder of a physically observed thermal model. However, the target thermal states provided by the users or determined via personalized or generic thermal comfort model may not be entirely feasible to achieve. Some embodiments are based on recognition that the physically observed thermal model of the trained neural network can still be used to determined the target HVAC setpoints using inverse mapping of the target thermal states. Additionally, or alternatively, some embodiments use retraining and/or other optimization technique to reduce the differences between the current thermal state and the target thermal state.

For example, one embodiment is further configured to update the neural network based on the target HVAC setpoints and the target thermal states using a loss function including a reconstruction loss to reduce a difference in temperature measurements at the predetermined locations and target temperatures of the target thermal states. Because the neural network is trained in weakly supervised manner, updating the parameters of neural network, as contrasted with just changing values of the input layers, can directly learn the inverse relationship of a thermal setpoint model for specific values of the target thermal states.

Figure 6A:
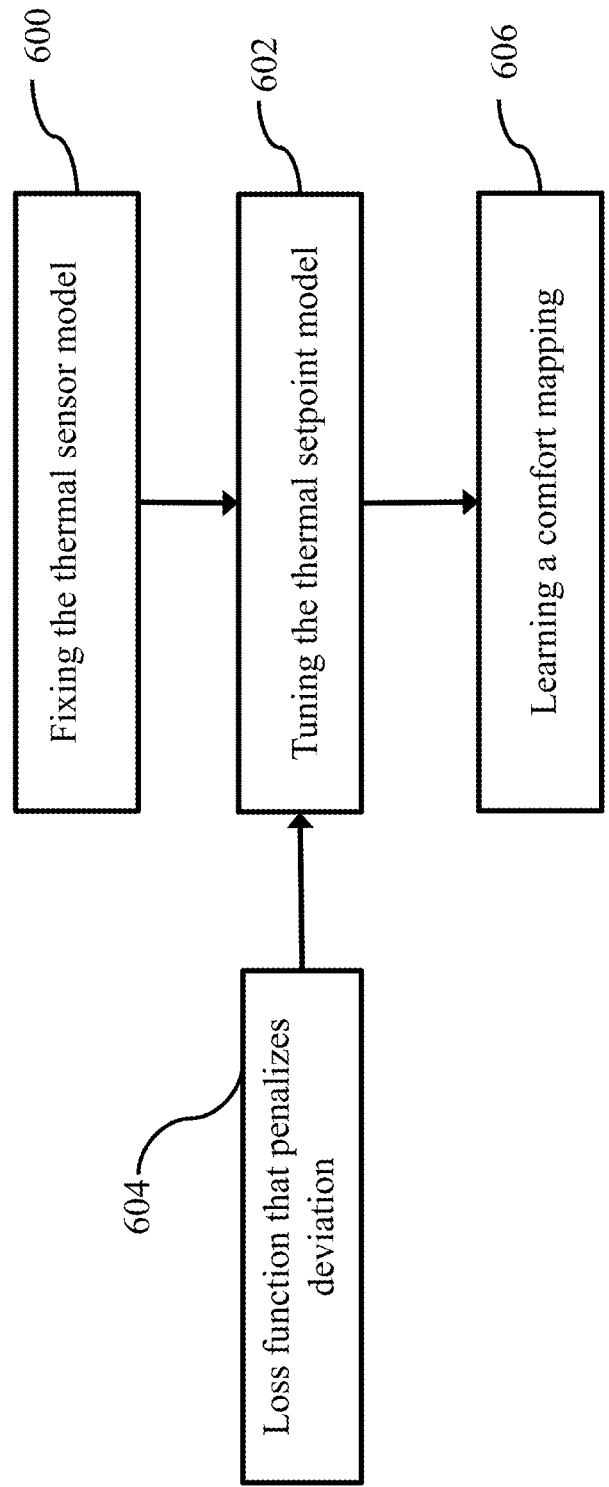
FIG. 6A shows a schematic for learning a control law to control the HVAC system such that comfort probability of occupants is maximized, according to some embodiments.

FIG. 6A shows a schematic for learning the thermal setpoint model to derive a control law to control the HVAC system such that the comfort probability of all the occupants is maximized, according to some embodiments. In an embodiment, the control law is initialized with the thermal setpoint model, eq. (2). In particular, the control law is warm started with the thermal setpoint model. Further, the control law is trained such that the estimated HVAC setpoints result in measurements $x_{T,i}$ at the occupant locations that correspond to $X^*_{T,k,i}$. Such training of the control law is accomplished by fixing the thermal sensor model 600 and tuning the thermal comfort model forming the control law 602. The control law is tuned using a loss function 604 that penalizes deviations from the optimal occupant temperature at each occupant's location. Such a loss function is given by $$\mathcal{L}_{C,l}(\tilde{X}(t), X_T^*) = \sum_{i \in M} \sum_{k \in K} (1(i)\tilde{x}_{T,i}(t) - 1(i,k)x^*_{T,k,i})^2 \qquad (6)$$

where $1(i) = 1$ if i corresponds to the closest sensor location to at least one occupant, and $1(i,k) = 1$ if i corresponds to the closest sensor location for the $k^{th}$ occupant. As a result, the thermal setpoint model learns a comfort mapping 606 that emphasizes occupant comfort over reconstruction/estimation of the thermal state.

In some implementations, the tuning 602 is based on the physically observed thermal model trained based on measurements of the thermal states and set points. To take advantage from feasibility of such a model, some embodiments, in response to receiving the target thermal states, retrain parameters of the thermal setpoint model 602 of the encoder in the physically observed thermal model for fixed parameters of the thermal sensor model 600 of the decoder in the physically observed thermal model. In such a manner, only relevant part of the thermal setpoint model connecting the target thermal states to the target HVAC setpoints is updated.

Additionally, or alternatively, to learn the control law, the control law is defined as the thermal setpoint model eq. (2), with an additional linear layer of dimension N added to output of the thermal setpoint model. The thermal sensor model and the thermal setpoint model are fixed, and training is performed on the additional linear layer using eq. (6). Such an approach for learning the control law is advantageous because there are many fewer model parameters to learn, resulting in a model that can be efficiently learned with few training data samples.

In some embodiments, the parameters of the encoder are retrained to reduce a reconstruction loss 604 for reconstructing the target thermal states including a weighted combination of reconstruction losses for each of the predetermined location. The weight of each of the predetermined location depends on a number of occupants of the conditioned environment associated with the predetermined location. In such a manner, the total comfort of all occupants can be improved.

However, some embodiments are based on realization that while retraining the autoencoder can provide a better mapping, the retraining takes time and works the best for fixed or rarely change locations of the occupants of the conditioned environment. When the occupants change their locations often, the retraining may be too slow than desired. To that end, additionally or alternatively to the retraining, some embodiments solve on optimization for the target HVAC set point given the target thermal states at dynamically changing locations of the occupants given the target thermal state for each occupant.

Figure 6B:
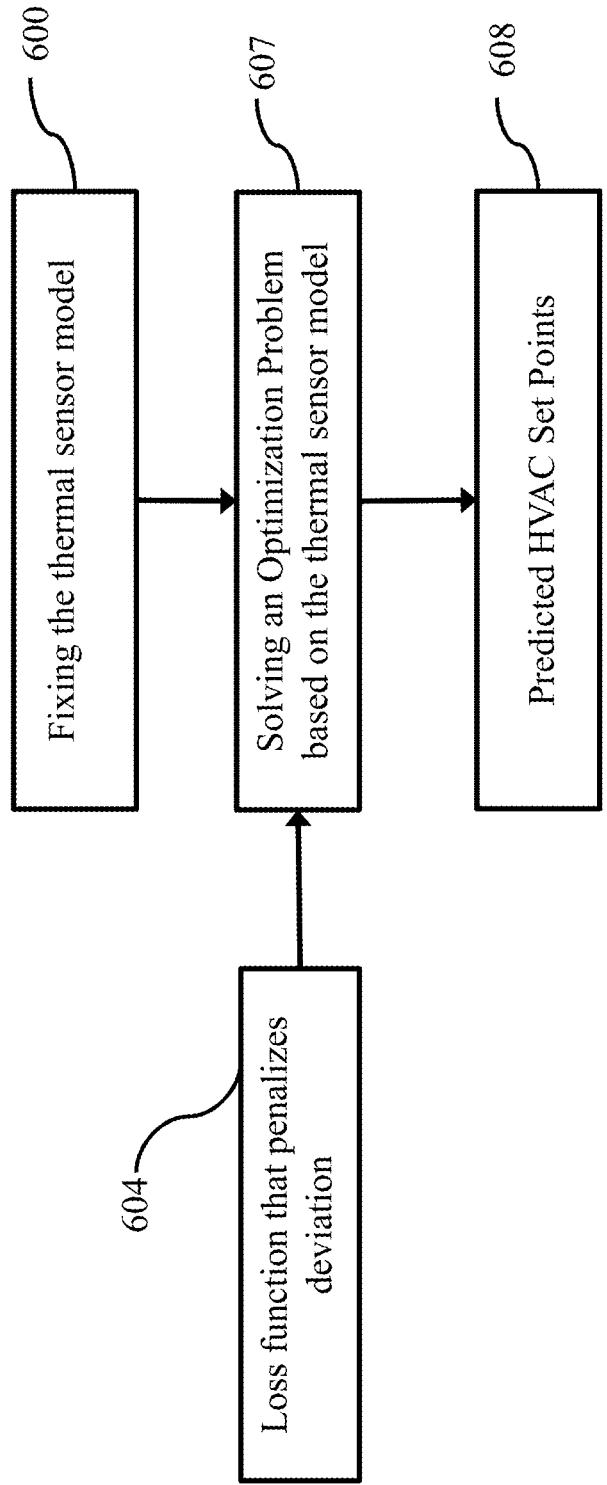
FIG. 6B shows a block diagram of a HVAC setpoints optimization according to some embodiments.

FIG. 6B shows a block diagram of a HVAC setpoints optimization according to some embodiments. In these embodiments, the HVAC set points 608 are directly found by solving an optimization problem 607. This embodiment is particularly applicable in cases where the occupants dynamically choose their seating areas, or frequently change their seating location. Here the thermal set point model eq. (2) is used to choose the initial solution for the optimization model, and optimization problem learns the best set of HVAC set points that minimize the comfort loss function eq. (6) as predicted by the thermal sensor model 600 of the eq. (3).

That is, at a given point in time, the current sensor measurements are input into the thermal set point model, eq. (2), and the physically learned HVAC set points are predicted. These set points are set as x0, the initial search point used during optimization. Next, the loss function, eq. (6) is optimized, i.e. a search over possible HVAC set points is the neighborhood of x0 is performed such that the predicted thermal states at the output of the thermal sensor model, eq. (6), at the user states optimally match the desired thermal states by the users. Thus, we search for the best set points near x0 that minimize the deviation from the desired thermal states near the users.

FIG. 7 illustrates controlling of the HVAC system 704, using the controller 200, to achieve thermal comfort of occupants, according to some embodiments. The HVAC system 704 is arranged to condition a room 706. In a case 700, the room 706 is occupied by occupants 708, 710, 712, and 714 at respective fixed locations. The controller 200 determines target HVAC setpoints based on personalized thermal comfort model of each of the occupants, and a thermal sensor model and a thermal setpoint model determined according to configuration of the room 706. Further, the controller 200 produces control commands corresponding to the target HVAC setpoints. The HVAC system 704 operates according to the control commands. Arrows 716, 718, and 720 around the occupants 708-714 represent current room conditions such as the temperature and the humidity in the room 702.

In a case 702, the room 706 is occupied by the occupants 712 and 714 at respective fixed locations. The controller 200 is configured to receive locations of the occupants in the room, i.e., occupants 712 and 714. Further, the controller 200 new target HVAC setpoints based on the personalized thermal comfort model of occupants 712 and 714, and the thermal sensor model and the thermal setpoint model determined according to configuration of the room 706. The controller 200 produces control commands corresponding to the new target HVAC setpoints. To that end, the HVAC system operates to condition the room 702 such that the HVAC system 704 conditions the room 702 only at the locations of present occupants while ensuring maximum comfort of the occupants 712 and 714. When the HVAC system 704 operates according to such control commands the room conditions update to room conditions 722 and 724. Further, since the new target HVAC setpoints are determined based on data driven models (the thermal sensor model and the thermal setpoint model) are used instead of analytically derived models, online computational burden on the controller 200 is reduced. Furthermore, as only personalized thermal comfort model of occupants 712 and 714 are considered, optimal per-point performance is achieved, thus allowing for computationally cheaper online comfort optimization.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a heating, ventilating, and air-conditioning (HVAC) system arranged to condition an environment according to HVAC setpoints, comprising: at least one processor; and memory having instructions stored thereon that, when executed by the at least one processor, cause the controller to:
accept target thermal states at predetermined locations in the conditioned environment, current thermal states at the predetermined locations in the conditioned environment, and current HVAC setpoints;
determine, using a neural network trained to establish an invertible relationship between thermal states at the predetermined locations and HVAC setpoints causing the thermal states, target HVAC setpoints such that a difference in an operation of the HVAC system according to the target HVAC setpoints with respect to the operation of the HVAC system according to the current HVAC setpoints changes the thermal states in the predetermined locations in the conditioned environment from the current thermal state to the target thermal state, wherein the neural network has autoencoding architecture having an encoder and a decoder connected with a latent layer corresponding to the HVAC setpoints, such that the encoder forms a thermal setpoint model that connects the thermal states to the HVAC setpoints while the decoder forms a thermal sensor model that connects the HVAC setpoints with the thermal states; and
produce and submit control commands to components of the HVAC system to operate according to the target HVAC setpoints.

2. The controller of claim 1, wherein an input layer of the encoder and an output layer of the decoder have a dimension equal to a number of the predetermined locations, and wherein the latent layer has a dimension equal to a number of the HVAC setpoints.

3. The controller of claim 1, wherein the processor is further configured to update the neural network based on the target HVAC setpoints and the target thermal states using a loss function including a reconstruction loss to reduce a difference in temperature measurements at the predetermined locations and target temperatures of the target thermal states.

4. The controller of claim 1, wherein the processor is configured to train the neural network based on training data including measurements of the thermal states and the predetermined locations and measurements of the HVAC setpoints causing the measurements of the thermal states, such that the encoder and the decoder of the trained neural network represent the encoder and the decoder of a physically observed thermal model.

5. The controller of claim 4, wherein the processor, in response to receiving the target thermal states, is configured to retrain parameters of the encoder of the physically observed thermal model for fixed parameters of the decoder in the physically observed thermal model to update the thermal setpoint model connecting the target thermal states to the target HVAC setpoints.

6. The controller of claim 5, wherein the encoder includes an output layer connected to and having dimensions of the latent layer, and wherein the processor, in response to receiving the target thermal states, is configured to retrain only parameters of the output layer of encoder.

7. The controller of claim 5, wherein the parameters of the encoder are retrained to reduce a reconstruction loss for reconstructing the target thermal states including a weighted combination of reconstruction losses for each of the predetermined location, and wherein a weight of each of the predetermined location depends on a number of occupants of the conditioned environment associated with the predetermined location, wherein the processor is further configured to:
receive locations of the occupants in the conditioned environment; and associate the occupants with their closest predetermined locations.

8. The controller of claim 7, wherein the processor, in response to detecting a change in the locations of the occupants, is further configured to optimize the target HVAC setpoints according to the thermal sensor model to produce the target thermal states at the changed locations of the occupants.

9. The controller of claim 1, wherein the processor is further configured to solve on optimization for the target HVAC set point given the target thermal states at dynamically changing locations of the occupants given the target thermal state for each occupant.

10. The controller of claim 1, wherein the target thermal states at the predetermined locations are determined based on thermal comfort model of the occupants in the conditioned environment.

11. The controller of claim 10, wherein the processor is further configured to update the thermal comfort model based on feedback of the occupants to form a personalized thermal comfort model for each occupant and determine the target thermal states based on the personalized thermal comfort model.

12. The controller of claim 10, wherein the thermal comfort model is determined based on labeled data sampled uniformly over a set of temperature and humidity values measured in the controlled environment.

13. The controller of claim 1, wherein the processor is further configured to control the HVAC system according a control law to optimize thermal comfort of the occupants, wherein the control law is learned based on optimal temperature of each occupant, and a loss function that penalizes deviations from the optimal temperature at each occupant's location.

14. The HVAC system including the controller of claim 1.

15. A method for controlling a heating, ventilating, and air-conditioning (HVAC) system arranged to condition an environment according to HVAC setpoints, wherein the method uses a processor coupled to a memory storing instructions, the processor is coupled with stored instructions when executed by the processor carry out steps of the method, comprising:
accepting target thermal states at predetermined locations in the conditioned environment, current thermal states at the predetermined locations in the conditioned environment, and current HVAC setpoints;
determining, using a neural network, target HVAC setpoints such that a difference in an operation of the HVAC system according to the target HVAC setpoints with respect to the operation of the HVAC system according to the current HVAC setpoints changes thermal states in the predetermined locations in the conditioned environment from the current thermal state to the target thermal state, wherein the neural network has an autoencoding architecture having an encoder and a decoder connected with a latent layer corresponding to the HVAC setpoints, such that the encoder connects the thermal states to the HVAC setpoints while the decoder connects the HVAC setpoints with the thermal states, wherein an input layer of the encoder and an output layer of the decoder have a dimension equal to a number of the predetermined locations, and wherein the latent layer has a dimension equal to a number of the HVAC setpoints; and producing and submitting control commands to components of the HVAC system to operate according to the target HVAC setpoints.

16. The method of claim 15, further comprising:

training the neural network based on training data including measurements of the thermal states and the predetermined locations and measurements of the HVAC setpoints causing the measurements of the thermal states, such that the encoder and the decoder of the trained neural network represent the encoder and the decoder of a physically observed thermal model; and retraining, in response to receiving the target thermal states, parameters of the encoder of the physically observed thermal model for fixed parameters of the decoder in the physically observed thermal model to update the thermal setpoint model connecting the target thermal states to the target HVAC setpoints.

17. The method of claim 16, wherein the parameters of the encoder are retrained to reduce a reconstruction loss for reconstructing the target thermal states including a weighted combination of reconstruction losses for each of the predetermined location, and wherein a weight of each of the predetermined location depends on a number of occupants of the conditioned environment associated with the predetermined location.

18. The method of claim 17, further comprising:

optimizing, in response to detecting a change in the locations of the occupants, the target HVAC setpoints according to the thermal sensor model to produce the target thermal states at the changed locations of the occupants.

* * * * *